(12) United States Patent
Takezawa et al.

(10) Patent No.: US 11,243,373 B2
(45) Date of Patent: Feb. 8, 2022

(54) LENS BARREL

(71) Applicant: Panasonic Intellectual Property Management Co., Ltd., Osaka (JP)

(72) Inventors: Hideyuki Takezawa, Tokyo (JP); Masayuki Takahashi, Tokyo (JP); Tetsuya Morita, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 228 days.

(21) Appl. No.: 16/775,669

(22) Filed: Jan. 29, 2020

(65) Prior Publication Data

US 2020/0257073 A1 Aug. 13, 2020

(30) Foreign Application Priority Data

Feb. 8, 2019 (JP) .............................. JP2019-021158

(51) Int. Cl.
  *G02B 7/02* (2021.01)
  *G03B 13/20* (2021.01)
  *G02B 7/04* (2021.01)

(52) U.S. Cl.
  CPC ............... *G02B 7/026* (2013.01); *G02B 7/04* (2013.01); *G03B 13/20* (2013.01)

(58) Field of Classification Search
  CPC .......... G03B 13/20; G02B 7/026; G02B 7/04; G02B 7/02
  USPC .......................... 359/825, 819, 822, 823, 826
  See application file for complete search history.

(56) References Cited

U.S. PATENT DOCUMENTS

| | | | | |
|---|---|---|---|---|
| 4,272,174 A | * | 6/1981 | Teramoto | G02B 7/04 396/137 |
| 4,299,470 A | * | 11/1981 | Shimizu | G03B 17/14 359/826 |
| 5,969,889 A | * | 10/1999 | Iikawa | G02B 7/08 359/823 |
| 8,559,807 B2 | * | 10/2013 | Toyama | G02B 7/08 396/137 |
| 8,565,591 B2 | * | 10/2013 | Toyama | G02B 7/08 396/131 |

(Continued)

FOREIGN PATENT DOCUMENTS

| | | |
|---|---|---|
| JP | S58-70528 U | 5/1983 |
| JP | 2000-321477 A | 11/2000 |

(Continued)

*Primary Examiner* — William R Alexander
(74) *Attorney, Agent, or Firm* — Renner, Otto, Boisselle & Sklar, LLP (57) ABSTRACT

A lens barrel includes: a first ring; a second ring that switches between a first position and a second position by sliding in an optical axis direction; a plurality of biasing mechanisms that are provided on one of the first ring and the second ring, and providing adjustable biasing force in a radial direction; and a locking portion provided on the other of the first ring and the second ring on which the plurality of biasing mechanisms are not provided. The plurality of biasing mechanisms each include an elastic component having a contact portion and a biasing component that biases the elastic component. The first ring and the second ring are integrally rotatable when the contact portion contacts the locking portion which opposes the contact portion when the second ring is at the second position.

7 Claims, 11 Drawing Sheets

(56) References Cited

U.S. PATENT DOCUMENTS

| | | | |
|---|---|---|---|
| 8,660,419 B2* | 2/2014 | Toyama | G03B 17/18 396/131 |
| 8,964,317 B2* | 2/2015 | Takano | G02B 7/04 359/825 |
| 2012/0328276 A1 | 12/2012 | Toyama et al. | |
| 2013/0163975 A1* | 6/2013 | Toyama | G02B 7/08 396/144 |
| 2013/0271860 A1* | 10/2013 | Arakawa | G02B 7/10 359/823 |
| 2013/0271862 A1* | 10/2013 | Takano | G02B 7/04 359/825 |
| 2014/0009847 A1* | 1/2014 | Toyama | G02B 7/09 359/825 |

FOREIGN PATENT DOCUMENTS

| | | |
|---|---|---|
| JP | 2012-255899 A | 12/2012 |
| JP | 2013-7906 A | 1/2013 |

\* cited by examiner

LENS BARREL

CROSS REFERENCE TO RELATED APPLICATION

The present application is based on and claims priority of Japanese Patent Application No. 2019-021158 filed on Feb. 8, 2019. The entire disclosure of the above-identified application, including the specification, drawings and claims is incorporated herein by reference in its entirety.

FIELD

The present disclosure relates to a lens barrel including a manual ring that slides in the optical axis direction.

BACKGROUND

Conventionally, there is known a lens barrel capable of focus adjustment by switching focus modes by sliding a manual ring in a direction parallel to the optical axis (hereafter referred to as optical axis direction).

Patent Literature (PTL) 1 discloses a lens barrel that includes a range indicator having a range marker, and a rotation operating component that can be positioned at a first position and a second position and is rotatable about the optical axis; the range indicator engages and rotates integrally with the rotation operating component in the first position, and does not engage with the rotation operating component in the second position.

Here, as a working example of a method for engaging the range indicator and the rotation operating component, PTL 1 discloses a technique of engagement using the friction between the range indicator and the rotation operating component. In the state where the rotation operating component is at the second position, the rotation operating component is pressed against the range indicator by biasing force that biases the rotation operating component toward the mounting direction to thereby generate friction between the range indicator and the rotation operating component such that the rotation operating component and the range indicator rotate together.

CITATION LIST

Patent Literature

PTL 1: Japanese Unexamined Patent Application Publication No. 2012-255899

SUMMARY

Technical Problem

In the technique in PTL 1, an elastic C-type ring is used as a biasing mechanism for generating frictional force. However, in order to deform the C-type ring to generate frictional force for causing the rotation operating component and the range indicator to engage, a very large amount of force is required. Consequently, this adversely affects the feel that is imparted to the user during sliding. Furthermore, since it is necessary to exert a load that causes the C-type ring to transition from the normal state to the deformed state each time the sliding is performed, durability of the C-type ring was a challenge. Furthermore, since the C-type ring is not fixed, the C-type ring may slip relative to the range indicator due to the rotation of the rotation operating component. Therefore, there is the risk that the C-type ring cannot sufficiently demonstrate its function as a biasing mechanism.

In view of the above-described challenge, the present disclosure provides a lens barrel that includes a space-saving biasing mechanism that imparts an excellent feel to a user during sliding of the manual ring in the optical axis direction, and enables this feel to be adjusted.

Solution to Problem

A lens barrel according to an aspect of the present disclosure includes: a first ring; a second ring that switches between a first position and a second position by sliding in an optical axis direction; a plurality of biasing mechanisms that are provided on one of the first ring and the second ring, and providing adjustable biasing force in a radial direction; and a locking portion provided on the other of the first ring and the second ring on which the plurality of biasing mechanisms are not provided. The plurality of biasing mechanisms each include an elastic component having a contact portion and a biasing component that biases the elastic component. The first ring and the second ring are integrally rotatable when the contact portion contacts the locking portion which opposes the contact portion when the second ring is at the second position.

Advantageous Effects

The present disclosure can provide a lens barrel including a space-saving biasing mechanism that imparts an excellent feel to a user during sliding of the manual ring in the optical axis direction, and enables this feel to be adjusted.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENT

Hereinafter, a working example for embodying the present disclosure will be described with reference to the drawings. It should be noted that this embodiment is not intended to limit the present disclosure.

Figure 1:
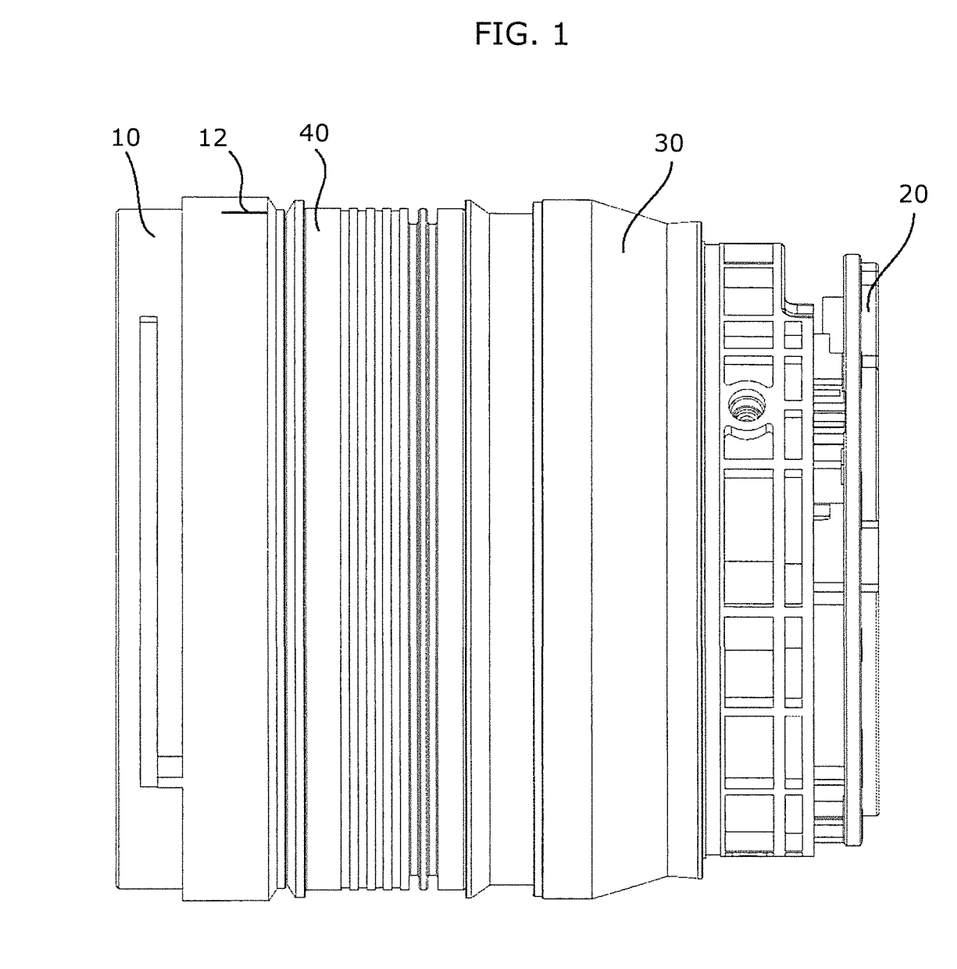
FIG. 1 is a plan view of main components of a lens barrel at a first position in a working example of the present disclosure.
Figure 2:
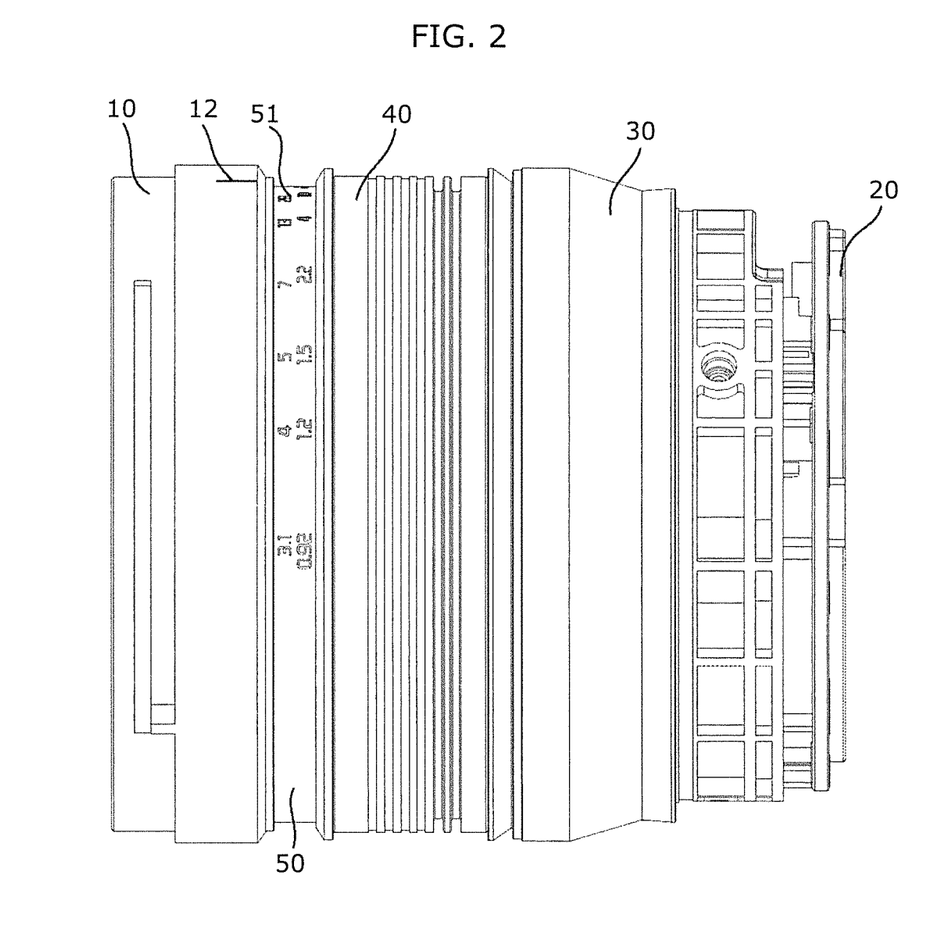
FIG. 2 is a plan view of main components of a lens barrel at a second position in a working example of the present disclosure.
Figure 3:
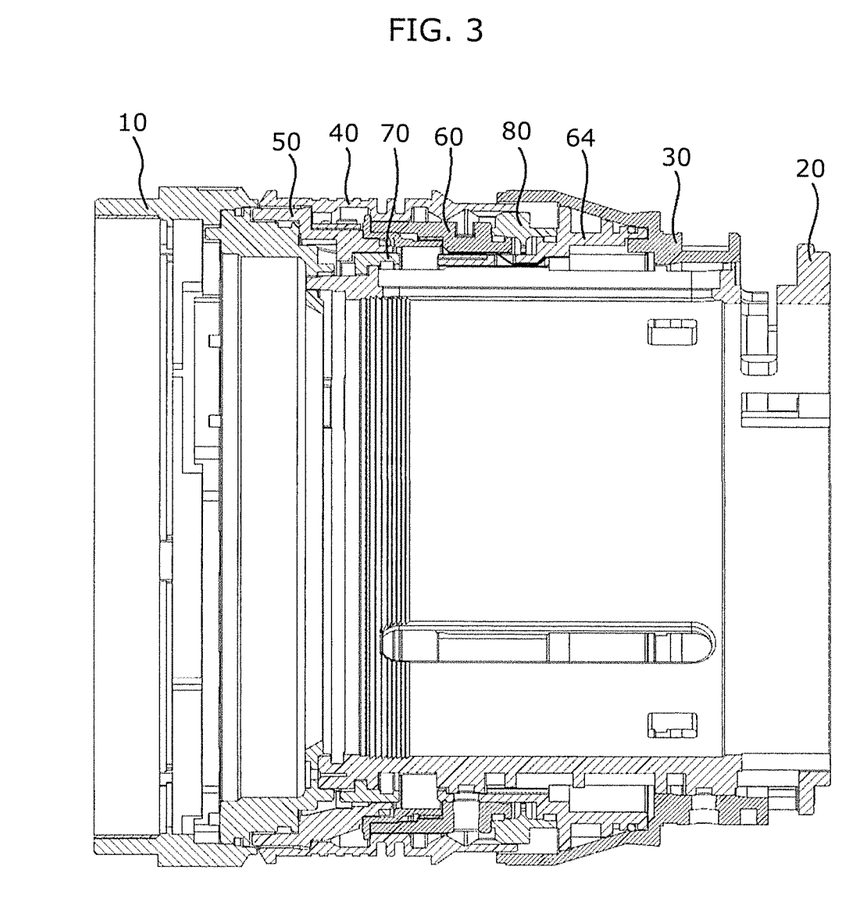
FIG. 3 is a cross-sectional view of main components of a lens barrel at a first position in a working example of the present disclosure.
Figure 4:
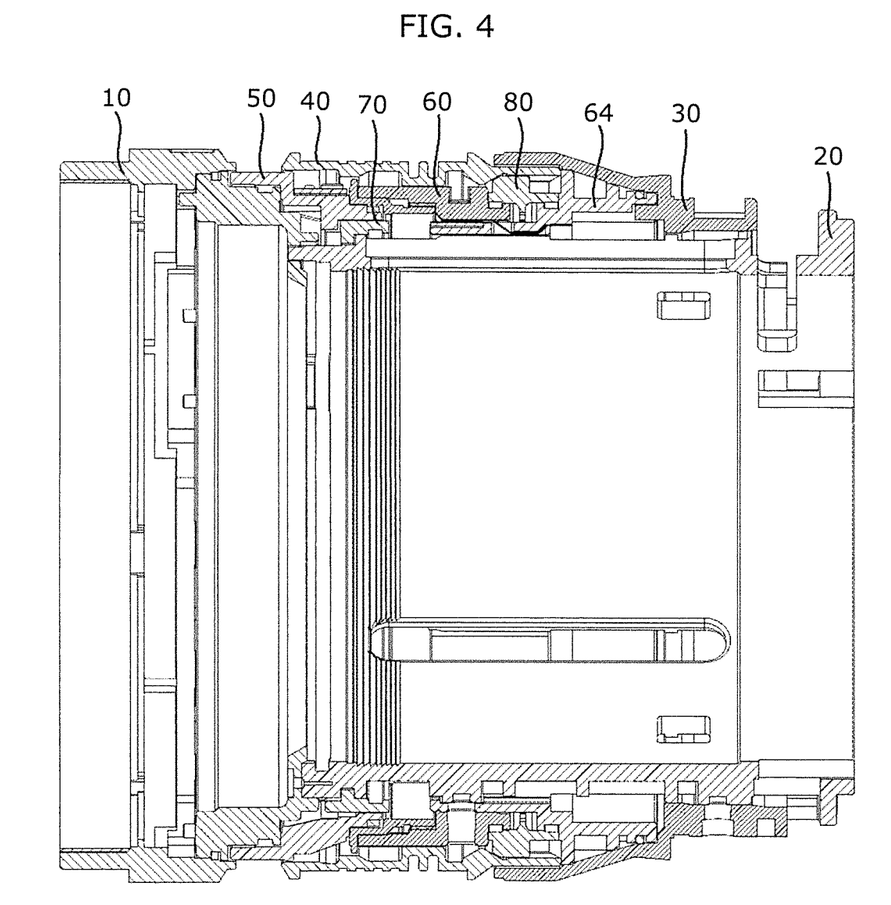
FIG. 4 is a cross-sectional view of main components of a lens barrel at a second position in a working example of the present disclosure.

FIG. 1 is a plan view of main components of a lens barrel at a first position in a working example of the present disclosure. FIG. 2 is a plan view of main components of a lens barrel at a second position in a working example of the present disclosure. FIG. 3 is a cross-sectional view of main components of a lens barrel at a first position in a working example of the present disclosure. FIG. 4 is a cross-sectional view of main components of a lens barrel at a second position in a working example of the present disclosure. Hereinafter, components of lens barrel 1 will be described with reference to FIG. 1 through FIG. 4. Furthermore, in this application, the right side in FIG. 1 will be referred to as the image-capturing device side and the opposite side (the left side) will be referred to as the object side.

Lens barrel 1 is an interchangeable photographic lens that is attached, via a mount section, to an image-capturing device (not shown), and whose optical system is centered on an optical axis. Furthermore, lens barrel 1 includes front frame 10, fixed cylinder 20, covering 30, manual ring 40, scale ring 50, first clutch base 60, second clutch base 64, first detection ring 70, second detection ring 80, and a detection mechanism. Furthermore, lens barrel 1 includes a lens CPU (not shown) that communicates various information with a CPU of the image-capturing device. Furthermore, lens barrel 1 includes a clutch mechanism that is slidable in the optical axis direction through a user's operation of manual ring 40.

Front frame 10 is a fixed component that includes, on an externally visible surface thereof, range index 12. Fixed cylinder 20 is a fixed component that internally includes an optical system. The optical system includes a plurality of lens groups, with some lens elements moving during focus adjustment, as focusing lenses. Furthermore, covering 30 is an externally visible component of lens barrel 1.

Manual ring 40 is a cylindrical operating component that enables focus adjustment by being manually rotated by the user. Manual ring 40 is slidable in the optical axis direction through the operation by the user, and is selectively positioned at either one of the movement range ends when not being operated. Furthermore, with regard to possible positions of manual ring 40, the position on the object side will be referred to as the first position and the position on the image-capturing device side will be referred to as the second position.

Figure 5:
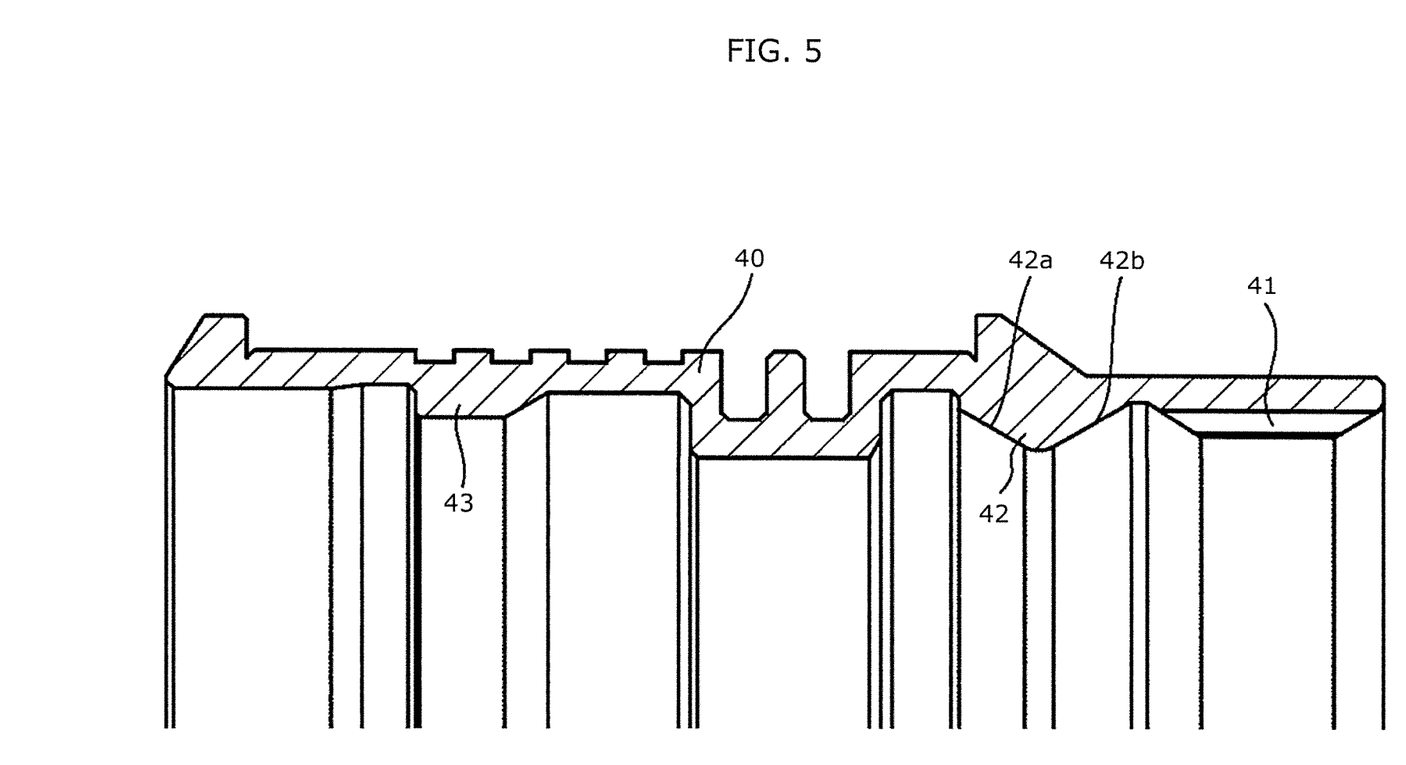
FIG. 5 is a cross-sectional view of a manual ring of a lens barrel in a working example of the present disclosure.

FIG. 5 is a cross-sectional view of manual ring 40 of lens barrel 1 in a working example of the present disclosure. Manual ring 40 includes, at two locations in an inner periphery, rectilinear keyways 41 with which protruding portions 81 of second detection ring 80 engage. Furthermore, manual ring 40 includes, in the inner periphery, mountain-shaped portion 42 having sloped portion 42b on the image-capturing device side which abuts ball 62 in the first position, and sloped portion 42a on the object side which abuts ball 62 in the second position. Furthermore, manual ring 40 includes, in the inner periphery, locking portion 43 which does not abut with other components in the first position, and abuts with friction springs 53 of each biasing mechanism in the second position.

Scale ring 50 is a cylindrical component which includes, on the surface thereof, range indicator 51. Scale ring 50 is rotatable about the optical axis, and includes biasing mechanisms at three equidistant locations on the outer periphery thereof. The biasing mechanisms will be described in detail later.

First clutch base 60 is a cylindrical component including a click-stop mechanism. The click-stop mechanism includes groove 61, ball 62, and click spring 63, and is provided at 6 locations on the outer periphery of first clutch base 60. Furthermore, second clutch base 64 is a cylindrical component including a detection mechanism.

First detection ring 70 is a cylindrical component that rotates integrally with scale ring 50. First detection ring 70 includes an encoder brush for rotation detection, and the rotation direction and rotation amount is detected by way of the absolute position of the encoder brush being detected by an encoder (not shown) that is provided in a fixed component. Furthermore, first detection ring 70 engages with fixed cylinder 20 my means of a bayonet portion. The groove of fixed cylinder 20 has two abutting portions, and the rotation range is restricted by way of the bayonet portion, which has engaged with groove 61, hitting the abutting portions.

Figure 6:
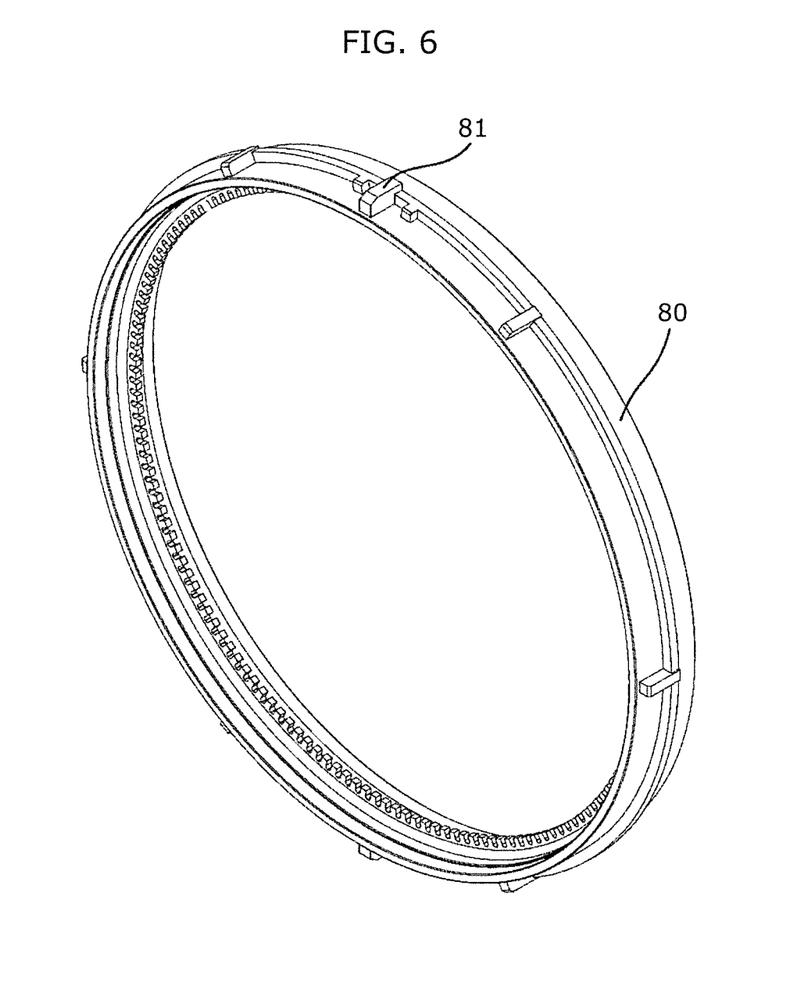
FIG. 6 is a perspective view of a second detection ring of a lens barrel in a working example of the present disclosure.

FIG. 6 is a perspective view of second detection ring 80 of lens barrel 1 in a working example of the present disclosure. Second detection ring 80 is a cylindrical component that engages and rotates integrally with manual ring 40. The inner periphery of second detection ring 80 is formed in the shape of teeth, and the rotation direction and the rotation amount from a reference position are detected when two pairs of photo interrupters (not shown) provided in fixed cylinder 20 detect the passage of slits, which are the gaps between the teeth, during rotation. Furthermore, second detection ring 80 includes, in the outer periphery, protruding portions 81 which engage with rectilinear keyways 41 of manual ring 40. When manual ring 40 slides in the optical axis direction, rectilinear keyways 41 slide while being constantly engaged with protruding portions 81.

Figure 7:
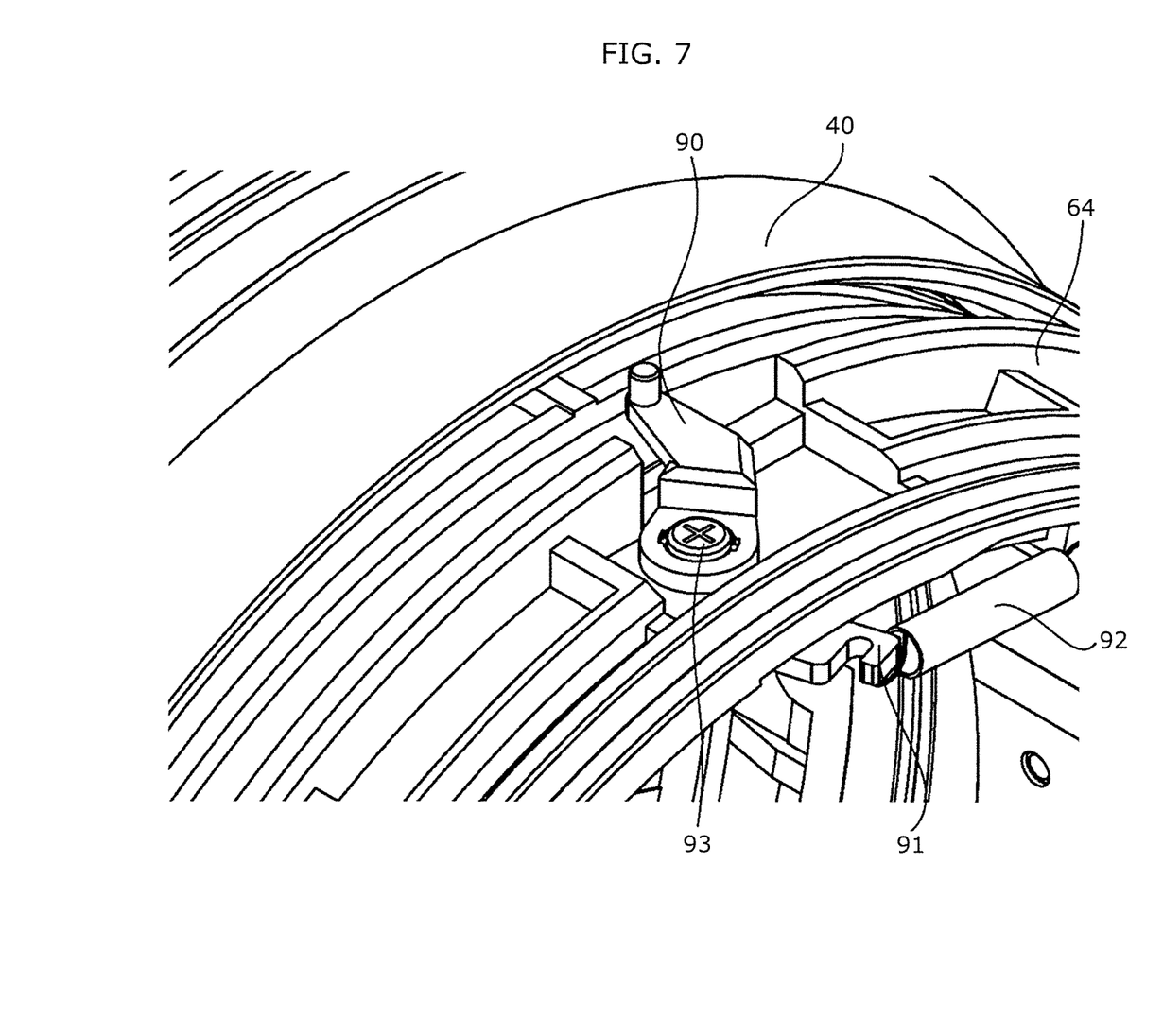
FIG. 7 is a perspective view of a detection mechanism of a lens barrel in a working example of the present disclosure.

FIG. 7 is a perspective view of a detection mechanism of lens barrel 1 in a working example of the present disclosure. First detection lever 90 is a manual ring 40 position-detecting component included in second clutch base 64. First detection lever 90 includes a through hole, and is fixed to second detection lever 91 present on the back surface of second clutch base 64 by having fastening component 93 inserted in the through hole. Bias spring 92 is attached to second detection lever 91, and first detection lever 90 is biased by the biasing force provided by bias spring 92 so as to constantly abut manual ring 40.

Next, the clutch mechanism of manual ring 40 will be described. The focus mode of lens barrel 1 in this working example can be switched using the clutch mechanism. When manual ring 40 is in the first position, the focus mode is in the auto-focus mode in which focus adjustment is performed automatically, and, when manual ring 40 is in the second position, the focus mode is in the manual focus mode in which focus adjustment is performed manually. It should be noted that lens barrel 1 in this working example employs a by-wire system in which manual ring 40 and the focus lens are not mechanically coupled, and thus the focus lens is driven and focus adjustment is performed according to a command from the image-capturing device, regardless of the focus mode.

First, the configuration in the first position will be described. In the first position, the object-side end of manual ring 40 abuts front frame 10, and thus movement in the optical axis direction toward the object side is restricted.

Furthermore, sloped portion 42b on the image-capturing device side of mountain-shaped portion 42 abuts ball 62 of the click-stop mechanism, and thus movement in the optical axis direction toward the image-capturing device side is restricted. Furthermore, by being covered by manual ring 40, scale ring 50 is not exposed to view from the outside and does not rotate during focus adjustment.

Focus adjustment according to the auto-focus mode in the first position is performed by the focus lens moving according to an in-lens motor (not shown), in accordance with a range-finding result of the image-capturing device. Lens barrel 1 according to this working example has a full-time manual function which allows manual adjustment by way of manual ring 40 even in the auto-focus mode. Since manual ring 40 engages with second detection ring 80, rotation operation by the user causes manual ring 40 to rotate integrally with second detection ring 80. The rotation amount and the rotation direction of second detection ring 80 is detected by the photo interrupters, and this information is transmitted to the image-capturing device, thereby enabling focus adjustment according to the intention of user.

Here, the click-stop mechanism in this working example includes groove 61, click spring 63, and ball 62, generates the clicking feel associated with the optical axis direction movement of manual ring 40, and has the effect of a restricting component in the optical axis direction of manual ring 40. It should be noted that ball 62 in this working example has metal as a material but is not limited to such.

Figure 8:
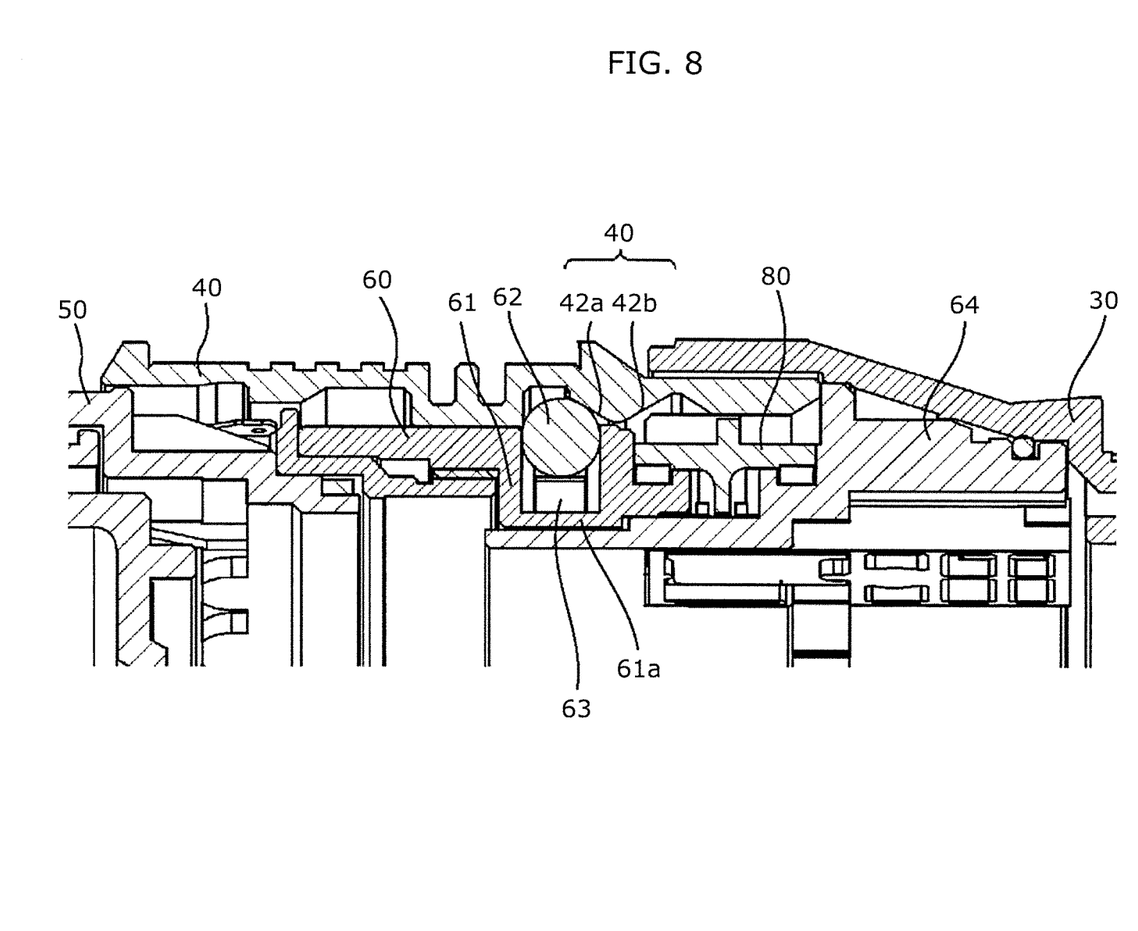
FIG. 8 is a cross-sectional view of a click-stop mechanism of a lens barrel in a working example of the present disclosure.

FIG. 8 is a cross-sectional view of the click-stop mechanism of lens barrel 1 in a working example of the present disclosure. First clutch base 60 includes groove 61 in a direction approximately orthogonal to the optical axis, and round hole portion 61a is provided in the middle of groove 61. Ball 62 is pressed into round hole portion 61a, and click spring 63 which biases ball 62 is pressed into groove 61.

In the first position, ball 62 abuts sloped portion 42b on the image-capturing device side of mountain-shaped portion 42. Here, when ball 62 receives force from the outer diameter direction of lens barrel 1, click spring 63 contracts and ball 62 is pressed into the inside of round hole portion 61a. Therefore, the click-stop mechanism restricts the sliding of manual ring 40 in the optical axis direction toward the image-capturing device side, within a range not exceeding a force that presses ball 62 into round hole portion 61a.

Next, the configuration in the second position will be described. In the second position, the image-capturing device-side end of manual ring 40 abuts second clutch base 64, thereby restricting movement in the optical axis direction toward the image-capturing device side. Furthermore, sloped portion 42a on the object side abuts ball 62, thereby restricting movement in the optical axis direction toward the object side. Furthermore, scale ring 50 is exposed to view from the outside and rotates integrally with manual ring 40 during focus adjustment. Therefore, the user can perform focus adjustment while checking range indicator 51 using range index 12 of front frame 10.

Figure 9:
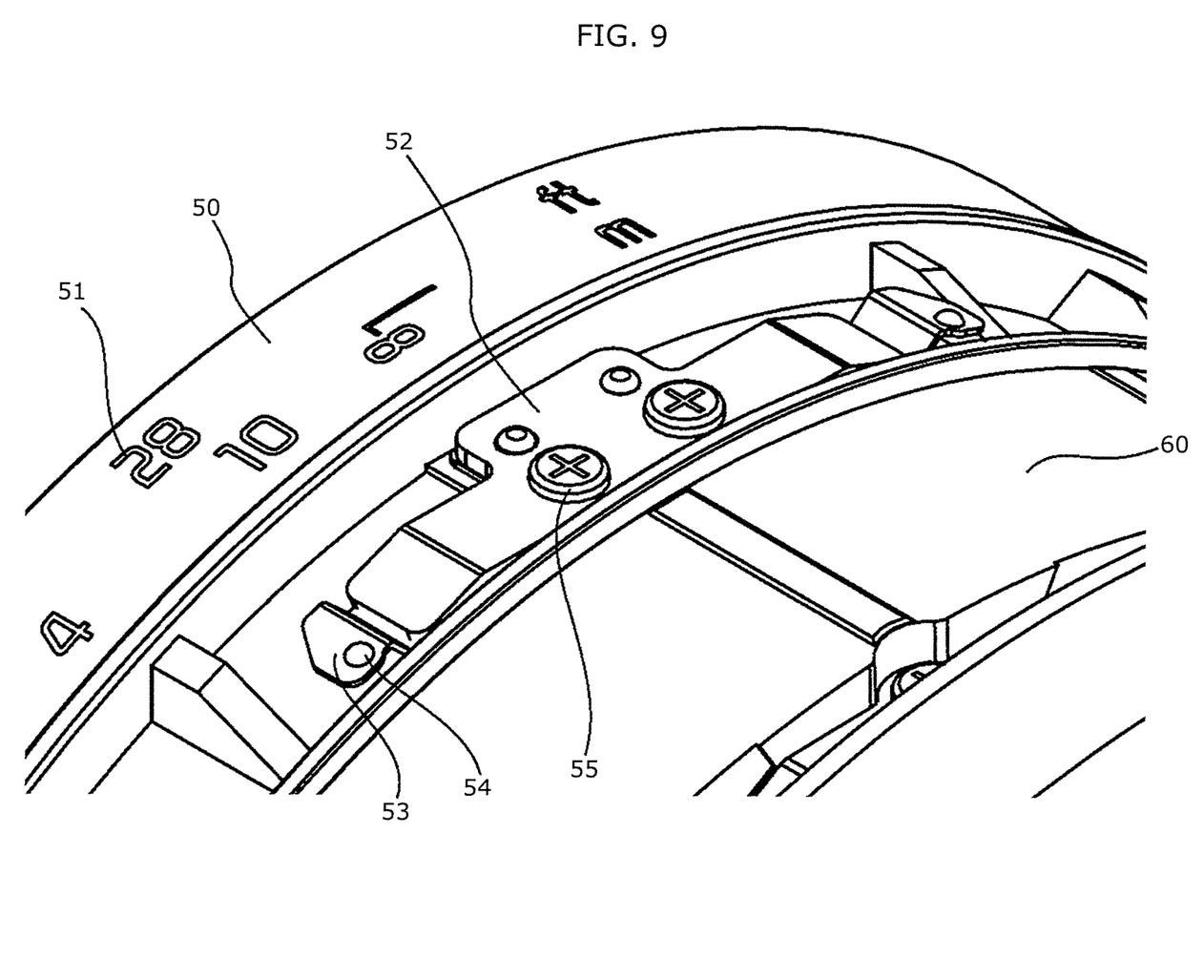
FIG. 9 is a perspective view of a biasing mechanism of a lens barrel in a working example of the present disclosure.
Figure 10:
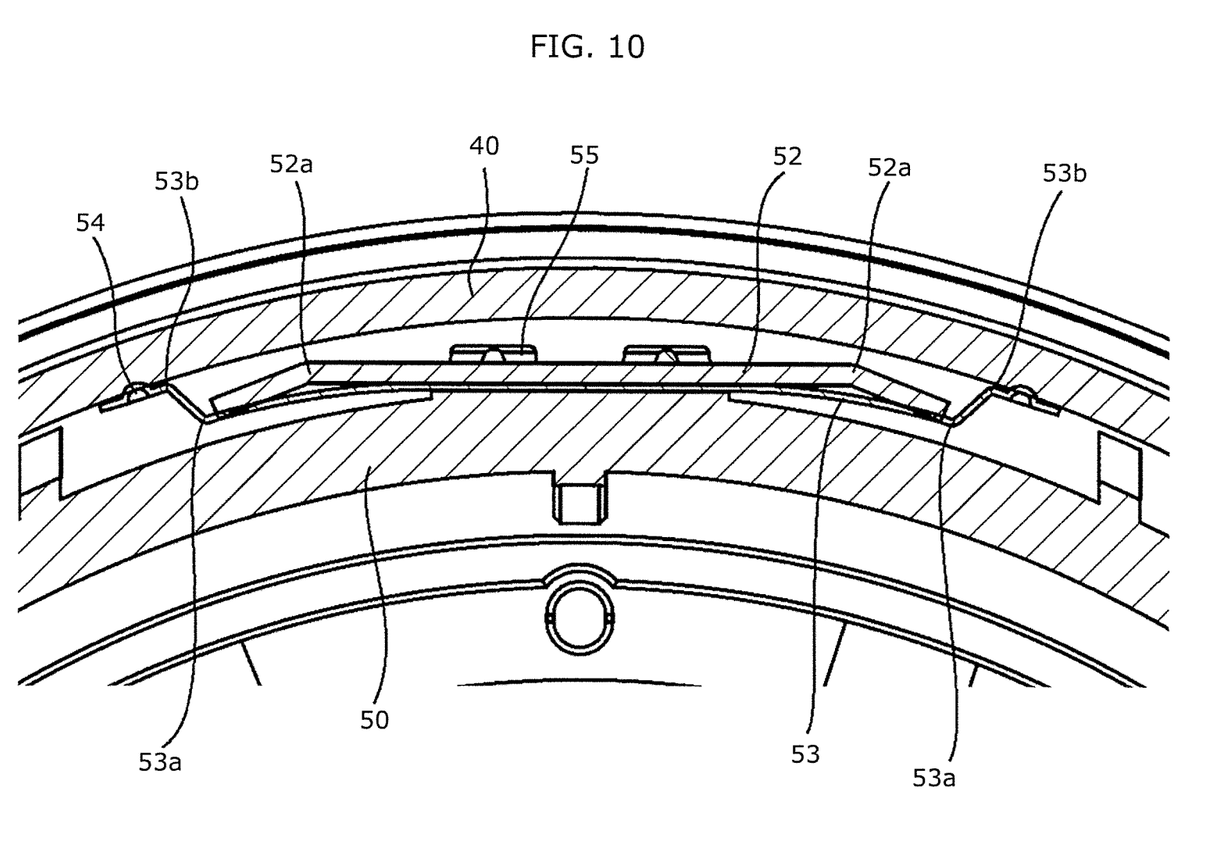
FIG. 10 is a cross-sectional view of a biasing mechanism of a lens barrel in a working example of the present disclosure.

In the second position, manual ring 40 engages with scale ring 50 due to the friction created by the biasing mechanisms. Therefore, when the user rotates manual ring 40, scale ring 50 rotates integrally with manual ring 40. FIG. 9 is a perspective view of a biasing mechanism in lens barrel 1 in a working example of the present disclosure. FIG. 10 is a cross-sectional view of the biasing mechanism in lens barrel 1 in a working example of the present disclosure. The biasing mechanism includes charge plate 52, friction spring 53, and fastening components 55, and is provided at three equidistant locations on the outer periphery of scale ring 50.

Charge plate 52 and friction spring 53 are jointly fastened to scale ring 50 by fastening components 55, with charge plate 52 as the upper layer. Charge plate 52 and friction spring 53 are elongated tabular components that are long in the circumferential direction of scale ring 50, and have two fastening holes near the middle into which fastening components 55 are inserted. Furthermore, charge plate 52 is bent toward the optical axis side at bent portions 52a provided on both sides of charge plate 52, with the fastening holes interposed therebetween. Friction spring 53 is bent away from the optical axis at first bent portions 53a provided on both sides of friction spring 53, with the fastening holes interposed therebetween, and is further bent toward the optical axis at second bent portions 53b so as to be step-shaped. Furthermore, friction spring 53 includes, at tip portions further beyond second bent portions 53b, contact portions 54 that contact the inner periphery of manual ring 40.

Here, friction spring 53, by itself, has a straight shape up to first bent portions 53a. However, in this working example, the contact and bias provided by charge plate 52 at two charge plate 52 pressing points cause friction spring 53 to bend toward the optical axis. In this manner, since there is an amount of displacement (bending) in friction plate 53 before hand, the amount of force when contacting manual ring 40 can be set suitably compared to when friction spring 53 is straight. Such advantageous effect will be described in detail later.

The focus adjustment according to the manual focus mode in the second position is performed by manual ring 40 being rotated by the user. Here, since scale ring 50 engages with first detection ring 70, rotation operation by the user causes scale ring 50 to rotate integrally with first detection ring 70. The absolute position of first detection ring 70 is successively detected by a focus brush, whereby the rotation amount and the rotation direction of first detection ring 70 is detected. Therefore, the lens CPU supplies the relative movement amount to the image-capturing device, and the image-capturing device drives the focus lens, thereby enabling focus adjustment according to the intention of user.

Furthermore, since the rotation range of first detection ring 70 is restricted by fixed cylinder 20, the rotation range of scale ring 50 which rotates integrally with first detection ring 70 is also restricted. Here, the positions at which the rotation of scale ring 50 stops become the focus close end and the focus infinity end. When the user rotates manual ring 40, scale ring 50 is caused to rotate integrally with manual ring 40 by the biasing mechanisms, and becomes unrotatable (i.e., ceases to rotate further) upon abutting the focus close end or the focus infinity end. When the user further rotates manual ring 40 in the state where scale ring 50 has become unrotatable, force exceeding the friction caused by the biasing mechanisms is exerted on manual ring 40, and thus manual ring 40 disengages from scale ring 50 and rotates individually. Specifically, manual ring 40 slips and is placed in a rotatable state (slip state). When manual ring 40 is rotated in the opposite direction in this state, manual ring 40 immediately re-engages with scale ring 50, and manual ring 40 rotates integrally with scale ring 50.

With this, even when a load in the rotation direction is inadvertently placed on manual ring 40 when lens barrel 1 is placed inside a bag, etc., or when the user rotates manual ring 40 with excessive force and scale ring 50 abuts the focus close end or the focus infinity end, damage to the mechanism can be prevented. Furthermore, even when the user continues to rotate manual ring 40 in the slip state, when the user rotates manual ring 40 in the opposite direction, the focus position can be adjusted without having to return manual ring 40 up to the position at which the slipping started.

Next, the configuration when moving manual ring 40 from the first position to the second position will be described. When a predetermined force is exerted on manual ring 40, ball 62 in the click-stop mechanism is pressed into groove 61 by sloped portion 42b on the image-capturing device side of mountain-shaped portion 42, thereby allowing sliding in the optical axis direction toward the image-capturing device side. When the apex of mountain-shaped portion 42 goes past ball 62, sloped portion 42a on the object side of mountain-shaped portion 42 subsequently abuts and biases ball 62. In addition, when manual ring 40 slides, manual ring 40 ultimately reaches the second position, and movement in the optical axis direction toward the object side is restricted by the click-stop mechanism. Furthermore, when a predetermined force in the optical axis direction is exerted on manual ring 40, a clicking sensation is generated by click spring 63.

Furthermore, guide portions 41 slide while being constantly engaged with protruding portions 81 when manual ring 40 moves from the first position to the second position, thereby causing the positional relationship between manual ring 40 and second detection ring 80 to change.

Furthermore, in moving manual ring 40 from the first position to the second position, first detection lever 90 rotates about fastening component 93 while constantly abutting manual ring 40. Second detection lever 91 which is fixed together with first detection lever 90 rotates in conjunction with the movement of manual ring 40 such that an arm portion (not shown) operates a detection switch to thereby detect the position of manual ring 40. The detected information is transmitted from the lens CPU to the image-capturing device.

Figure 11:
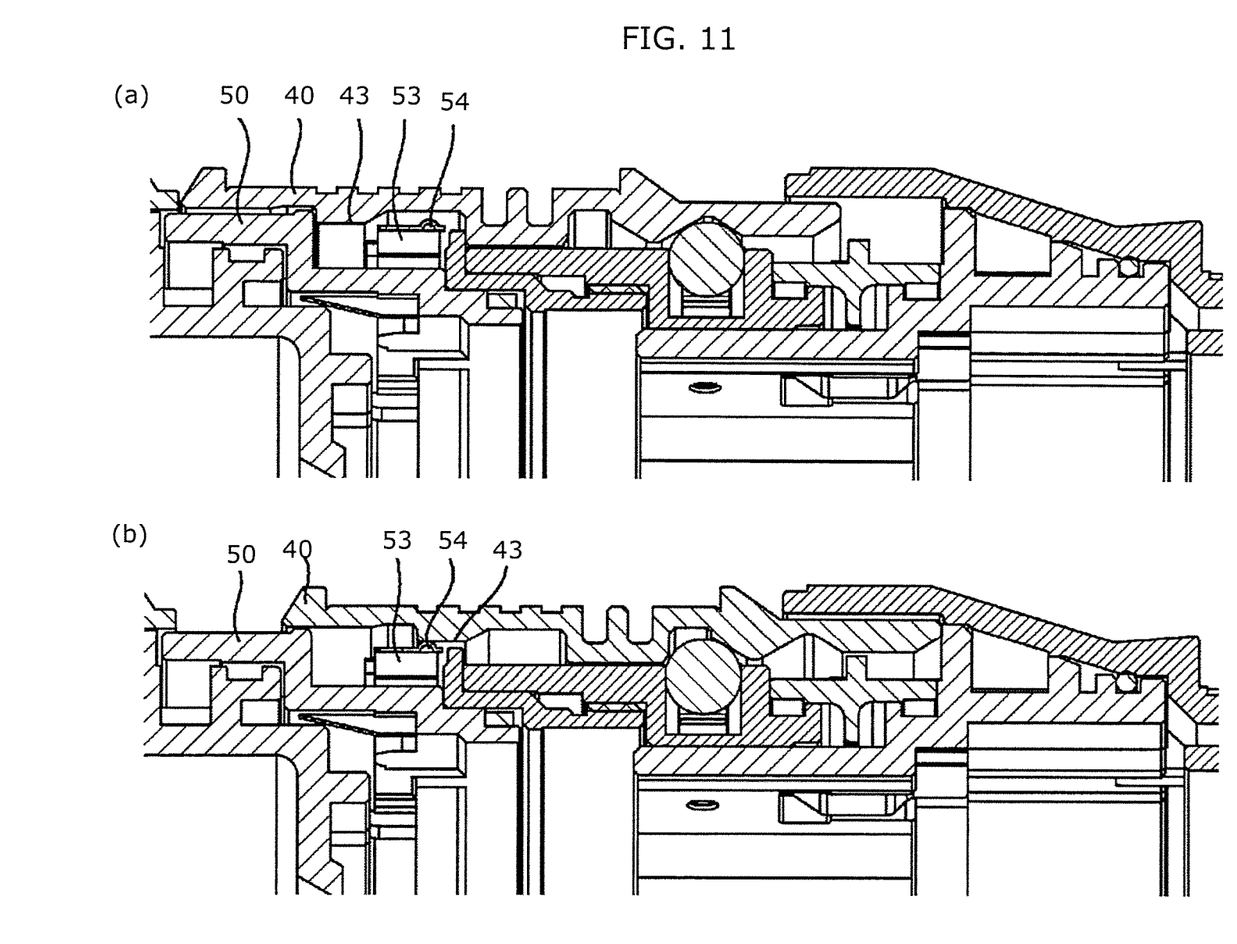
FIG. 11 illustrates cross-sectional views of a biasing mechanism at each of positions in a lens barrel in a working example of the present disclosure.

FIG. 11 illustrates cross-sectional views of a biasing mechanism at respective positions in a lens barrel in a working example of the present disclosure. Here, (a) in FIG. 11 illustrates the biasing mechanism at the first position, and (b) in FIG. 11 illustrates the biasing mechanism at the second position. Contact portions 54 of friction spring 53 are of such height as to abut only locking portion 43 of manual ring 40, without abutting other components. Here, locking portion 43 is in the shape of a mountain, and the positional relationship between contact portions 54 and locking portion 43 is such that there is no contact therebetween in the first position, and contact portions 54 and the apex of locking portion 43 come into contact in the second position. Therefore, when manual ring 40 moves from the first position to the second position, contact portions 54 and the apex of locking portion 43 come into contact such that further pressing in by manual ring 40 causes friction spring 53 to bend slightly toward the optical axis. The bias in the radial direction generated by the repulsive force of this bending causes manual ring 40 and scale ring 50 to engage.

Here, friction spring 53 in this working example is biased by charge plate 52 so as to be bent in advance in the optical axis direction. Therefore, compared to friction spring 53 that is not deformed (i.e., not bent), bending toward the optical axis direction with minimal force is possible. With the reduction in required force, lens barrel 1 in this working example does not adversely affect the feel of the user during sliding of manual ring 40.

Furthermore, because friction spring 53 is bent in the optical axis direction, the required space inside the lens can be reduced compared to when friction spring 53 is not deformed. Furthermore, there is no risk of contact with other components in lens barrel 1.

Here, it is also possible to form conical surfaces in the circumferential direction of manual ring 40 and scale ring 50 and move one of the rings in the optical axis direction to press against the other ring so that the friction engagement due to the friction generated between the conical surfaces by the force in the optical axis direction causes switching. In this case, when the length in the optical axis direction is reduced, the angle of the conical surfaces need to be made more acute, and thus the user needs a larger force for switching, which is unpleasant.

Conversely, if the angle of the conical surfaces is made too obtuse in order to resolve the unpleasantness felt by the user, the length in the optical axis direction increases, and thus the lens barrel cannot be made compact. Furthermore, if the angle of the conical surfaces is made too obtuse, variation between products, etc., may cause variation in the position in the optical direction at which the rings engage and start rotating in conjunction with each other. Alternatively, if the angle of the conical surfaces is made too obtuse, wear on the conical surfaces caused by usage, etc., may cause variation in the above-mentioned position in the optical axis direction.

In contrast, the biasing mechanisms according to the present disclosure provide bias in the radial direction, and thus it is possible to realize excellent feel for the user during sliding in the optical axis direction while keeping the length of the lens barrel in the optical axis direction compact.

As described above, with the biasing mechanisms according to the present disclosure, it is possible to save space inside the lens barrel and obtain the necessary friction for engagement between manual ring 40 and scale ring 50 while obtaining a suitable feel during sliding of manual ring 40.

Furthermore, the amount of bending to be provided in advance to friction spring 53 can be set according to the shape of charge plate 52. Therefore, the feel during the sliding of manual ring 40 can be adjusted as necessary, by merely changing the shape of the bent portions of charge plate 52.

Furthermore, since friction spring 53 is displaced in advance, the amount of displacement of friction spring 53 during sliding is small, and thus the load for deforming is minimal. Therefore, durability of the biasing mechanisms is excellent.

Furthermore, since friction spring 53 is fixed to scale ring 50, the position of friction spring 53 relative to scale ring 50 does not change even when sliding of manual ring 40 is performed. In addition, since charge plate 52 and friction spring 53 are jointly fastened to scale ring 50, the amount of bending caused by charge plate 52 does not change. Therefore, the biasing mechanisms reliably cause engagement between scale ring 50 and manual ring 40.

Furthermore, by placing the biasing mechanisms at three equidistant locations on the outer periphery of scale ring 50, the area on which biasing force is applied becomes symmetrically distributed. Therefore, there is no imbalance in the frictional force generated from scale ring 50, and thus manual ring 40 does not slip within the focus range. Furthermore, deterioration of feel due to imbalance of frictional force does not occur during sliding of manual ring 40.

It should be noted that although in this working example, scale ring 50 includes the biasing mechanisms, lens barrel 1 is not limited to this configuration. Lens barrel 1 may be configured so that manual ring 40 includes the biasing mechanisms and scale ring 50 includes locking portion 43, and manual ring 40 and scale ring 50 rotate integrally at the first position.

Although only some exemplary embodiments of the present disclosure have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The technique disclosed herein can be used as a lens barrel used in an optical device such as a digital still camera, a digital video camera, and a film camera, for example.

The invention claimed is:

1. A lens barrel, comprising:
a first ring;
a second ring that switches between a first position and a second position by sliding in an optical axis direction;
a plurality of biasing mechanisms that are provided on one of the first ring and the second ring, and provide biasing force in a radial direction; and
a locking portion provided on an other of the first ring and the second ring on which the plurality of biasing mechanisms are not provided, wherein
the plurality of biasing mechanisms each include:
an elastic component having a contact portion; and
a biasing component that biases the elastic component, and
the first ring and the second ring are integrally rotatable when the contact portion presses against the locking portion which opposes the contact portion when the second ring is at the second position.

2. The lens barrel according to claim 1, wherein
the elastic component and the biasing component are tabular components that are jointly fastened to the one of the first ring and the second ring by a fastening component,
the biasing component includes bent portions at opposite sides and a fastening hole disposed between the bent portions, and
the elastic component is biased in the radial direction by the bent portions.

3. The lens barrel according to claim 1, wherein
the plurality of biasing mechanisms are disposed at three equidistant locations along a circumference of the one of the first ring and the second ring.

4. The lens barrel according to claim 1, further comprising:
a detection lever including a pivot, wherein
a position of the second ring in the optical axis direction is determined by the detection lever rotating about a fastening component and operating a detection switch.

5. The lens barrel according to claim 1, further comprising:
a click-stop mechanism including a spherical component and a click spring that biases the spherical component against a sloped portion in an inner periphery of the second ring, the click-stop mechanism restricting the sliding of the second ring in the optical axis direction.

6. The lens barrel according to claim 1, wherein
the first ring is a scale ring including a range indicator,
the second ring is a manual ring, and
the range indicator is hidden from view by the manual ring in the first position, and is exposed to view in the second position.

7. The lens barrel according to claim 6, wherein
the lens barrel is to be attached to an image-capturing device, and
focus adjustment is performed according to a result of range-finding by the image-capturing device when the manual ring is in the first position, and is performed by rotating the manual ring when the manual ring is in the second position.

* * * * *

UNITED STATES PATENT AND TRADEMARK OFFICE
CERTIFICATE OF CORRECTION

| | |
|---|---|
| PATENT NO. | : 11,243,373 B2 |
| APPLICATION NO. | : 16/775669 |
| DATED | : February 8, 2022 |
| INVENTOR(S) | : Hideyuki Takezawa, Masayuki Takahashi and Tetsuya Morita |

It is certified that error appears in the above-identified patent and that said Letters Patent is hereby corrected as shown below:

On the Title Page

Item (72), should read:
Inventors:
Hideyuki Takezawa, Tokyo (JP);
Masayuki Takahashi, Kanagawa (JP);
Tetsuya Morita, Osaka (JP)

Signed and Sealed this
Twentieth Day of September, 2022

Katherine Kelly Vidal
*Director of the United States Patent and Trademark Office*